US011783236B2

(12) United States Patent
Millefiorini et al.

(10) Patent No.: US 11,783,236 B2
(45) Date of Patent: Oct. 10, 2023

(54) SYSTEM FOR DETECTING COMPLIANCE OF A CONTAINER

(71) Applicant: Accenture Global Solutions Limited, Dublin (IE)

(72) Inventors: Marco Millefiorini, Latina (IT); Carlo Ortensi, Rome (IT)

(73) Assignee: Accenture Global Solutions Limited, Dublin (IE)

(*) Notice: Subject to any disclaimer, the term of this patent is extended or adjusted under 35 U.S.C. 154(b) by 546 days.

(21) Appl. No.: 16/841,114

(22) Filed: Apr. 6, 2020

(65) Prior Publication Data
US 2021/0224734 A1 Jul. 22, 2021

(30) Foreign Application Priority Data
Jan. 20, 2020 (EP) .................................... 20425003

(51) Int. Cl.
*G06Q 10/00* (2023.01)
*G06F 16/2455* (2019.01)
(Continued)

(52) U.S. Cl.
CPC ............. *G06Q 10/00* (2013.01); *G01B 11/06* (2013.01); *G01B 17/00* (2013.01); *G01G 19/005* (2013.01);
(Continued)

(58) Field of Classification Search
CPC .... G06Q 10/0832; G01B 11/06; G01B 17/00; G01B 11/022; G01B 11/245; G01B 21/02;
(Continued)

(56) References Cited

U.S. PATENT DOCUMENTS 8,990,199 B1 * 3/2015 Ramesh ................ G06F 16/951
707/740
2002/0038567 A1 * 4/2002 Luchinger .............. G01G 21/28
73/1.13
(Continued)

OTHER PUBLICATIONS

Trujillo, V. E., & Hinders, M. K. (2019). Container monitoring with infrared catadioptric imaging and automatic intruder detection. SN Applied Sciences, 1(12), 1-25.*
(Continued)

*Primary Examiner* — Sarah Lhymn
(74) *Attorney, Agent, or Firm* — Norton Rose Fulbright US LLP

(57) ABSTRACT

Systems, methods, and computer-readable storage media for determining compliance of a container with composite signatures are disclosed. The disclosed techniques utilize a first device (e.g., an edge device) to determine characteristics of a container, such as dimensions, weight, indicia, or a combination thereof. Information indicative of the characteristics is sent to a computing device that determines a composite signature (or parameters) of the container based on the information. The computing device compares the composite signature (or parameters) to one or more stored composite signatures to determine compliance of the composite signature (e.g., of the container) with the one or more stored composite signatures (or stored parameters). The computing device also controls a process of managing a release of the container based on the compliance or non-compliance.

19 Claims, 6 Drawing Sheets

(51) Int. Cl.
*G06N 20/00* (2019.01)
*G01B 11/06* (2006.01)
*G01B 17/00* (2006.01)
*G01G 19/00* (2006.01)
*G06Q 10/0832* (2023.01)
*G06T 7/62* (2017.01)
*G06F 18/214* (2023.01)

(52) U.S. Cl.
CPC ...... *G06F 16/24558* (2019.01); *G06F 18/214* (2023.01); *G06N 20/00* (2019.01); *G06Q 10/0832* (2013.01); *G06T 7/62* (2017.01)

(58) Field of Classification Search
CPC .... G01G 19/005; G06K 9/6256; G06N 20/00; G06T 7/62; G06V 30/10
See application file for complete search history.

(56) References Cited

U.S. PATENT DOCUMENTS

| | | | | |
|---|---|---|---|---|
| 2006/0154642 A1* | 7/2006 | Scannell, Jr. | ......... | G08B 7/066 455/404.1 |
| 2010/0012653 A1* | 1/2010 | Ulrich | ............... | B65D 81/3825 220/1.5 |
| 2010/0066561 A1* | 3/2010 | Ulrich | ..................... | H04Q 9/00 340/870.07 |
| 2016/0147976 A1* | 5/2016 | Jain | ........................ | G16H 20/10 705/2 |
| 2016/0363990 A1 | 12/2016 | Key | | |
| 2018/0048677 A1 | 2/2018 | Grisham | | |
| 2018/0054490 A1* | 2/2018 | Wadhwa | ................ | G06V 20/52 |
| 2018/0374046 A1* | 12/2018 | Powers | ........... | G06Q 10/08345 |
| 2020/0027196 A1* | 1/2020 | Wolfson | .................... | G06T 5/50 |
| 2020/0099531 A1* | 3/2020 | Chidambaram | ....... | G06Q 50/18 |
| 2020/0160497 A1* | 5/2020 | Shah | ....................... | G06T 7/001 |
| 2021/0133670 A1* | 5/2021 | Cella | ........................ | G06N 5/04 |
| 2022/0036302 A1* | 2/2022 | Cella | .................... | G06Q 10/103 |
| 2022/0122031 A1* | 4/2022 | Powers | .............. | G06Q 10/0832 |

OTHER PUBLICATIONS

Ren, Q., Cheng, H., & Han, H. (Mar. 2017). Research on machine learning framework based on random forest algorithm. In AIP conference proceedings (vol. 1820, No. 1, p. 080020). AIP Publishing LLC.*

Hillebrand, A., Thiele, S., Junk, P., Hildebrandt, C., Needham, P., & Kortüm, M. (2016). Technology and change in postal services-impacts on consumers. Bad Honnef: WIK Consult and ITA Consulting.*

European Patent Office, Communication, Extended European Search Report issued for European Patent Application No. 20425003.9, dated May 13, 2020, 9 pages.

Web page for Cubiscan 100, https://cubiscan.com/cubiscan-100-parcel-dimensioner/?utm_term=%2Bparcel%20%2Bdimensioning&utm_source=adwords&utm_campaign=Dimensioning+Systems&utm_medium=ppc&hsa_mt=b&hsa_src=g&hsa_kw=%2Bparcel%20%2Bdimensioning&hsa_ad=374175013826&hsa_tgt=kwd-423362904669&hsa_ver=3&hsa_acc=6383244468&hsa_net=adwords&hsa_cam=1589450109&hsa_grp=79267406369&gclid=Cj0KCQiAtf_tBRDtARIsAlbAKe33yW6mgS6bbSHp4xIBSTdwUntSxYvmlFn3ysmvGjN1APH95FZBWo4aAuUwEALw_wcB, last accessed Apr. 6, 2020.

Web page for Scati Labs, S.A., https://www.scati.com/en/solutions/logistica_16.html, last accessed Apr. 6, 2020.

Web page for Bluecrest TrueSort® Parcel Solution, https://www.bluecrestinc.co.uk/products/sorters/truesort-automated-parcel-solution/?utm_source=referral&utm_medium=PB_redirect&utm_campaign=UK, last accessed Apr. 6, 2020.

Web page for Siemens Automatic Reading and Coding, https://www.siemens-logistics.com/en/parcel-logistics/reading-and-coding, last accessed Apr. 6, 2020.

* cited by examiner

SYSTEM FOR DETECTING COMPLIANCE OF A CONTAINER

CROSS REFERENCE TO RELATED APPLICATION

The present application claims priority to European Patent Application No. 20425003.9, filed Jan. 20, 2020, the disclosure of which is incorporated herein by reference in its entirety.

TECHNICAL FIELD

The present application relates to container detection systems and more specifically to systems utilizing sensors and machine learning techniques to detect compliance of a configuration of a container.

BACKGROUND

Containers, such as envelopes, flats, boxes, cards, and the like, often need to fit certain specifications, such as dimensions (e.g., length, width, height), weight, etc. These specifications may be set by an external source or internally to ensure that the containers are able to be used with various pieces of equipment. One such example is a bulk mailing campaign. In a bulk mailing campaign, an envelope or package (e.g., a container) is required to be within certain specified dimensions, weights, and/or have certain specified indicia on the envelope or package, such as logos, address information, etc. If the envelopes or packages differ in these characteristics, the bulk mailing campaign cannot be accurately priced and there is the possibility that the envelopes or packages will not fit in mail-sorting equipment. However, ensuring that the envelopes or packages are within specifications (e.g., match a composite signature including dimensions, weight, indicia, etc.) can be a difficult and time consuming process. For example, a mail service employee may receive a picture of the envelope or package that is desired to be sent as the bulk mailing campaign. It may be difficult to judge by looking at a picture what the dimensions or weight of the package are. Additionally, to ensure compliance with the composite signature (e.g., the specifications), a mail service employee may individually measure the dimensions of envelopes or packages, which can be time consuming and inaccurate (due to human error).

SUMMARY

The present application is directed to systems, devices and techniques for determining compliance of a container with one or more predetermined parameters and/or composite signatures. In aspects, a system includes a device for measuring characteristics of a container, also referred to herein as an edge device, and a computing device for determining the compliance of the container with one or more parameters or composite signatures. The measuring device (e.g., the edge device) is configured to measure characteristics (dimensions, weight, and/or indicia) of a container using various sensors (e.g., cameras, scales, ultrasonic sensors, etc.) and to provide the information obtained to the computing device. In one implementation, the measuring device (e.g., the edge device) includes a first sensor for capturing image data of a particular side of the container, a second sensor and a third sensor for capturing a dimension (e.g., height) of the container, and a fourth sensor for measuring a weight of the container. In some implementations, the first sensor is a high definition camera, the second sensor is a camera, the third sensor is an ultrasonic sensor, and the fourth sensor is a scale. The four sensors may be combined on a modular frame for easy assembly and disassembly. Additionally, the measuring device may be sized sufficiently small so as to fit within a mail service employee's work station. In some implementations, the measuring device may be as small as 39 centimeters (cm) long, 37 cm wide, and 47 cm high, enabling easy storage and use by a mail service employee.

The computing device may be configured to generate a composite signature of the container based on the information and to compare the parameters or generated composite signature to stored parameters/composite signatures. As used herein, a composite signature may be a value derived from characteristics of a container, such as a hash value of the dimensions (e.g., length, width, and/or height), weight, and/or indicia on a particular side of the container or simply a string of one or more parameter values (e.g., DDWWII, with "DD" representing one or more dimension values, "WW" representing a weight value, and "II" representing indicia characteristics or values). Alternatively, the computing device may determine parameters for the container based on the information from the edge device and may compare the derived parameters to one or more stored parameters. Based on the comparison, the computing device controls a release of the container. For example, if the composite signature (or parameters) matches one or more of the stored composites signatures (or stored parameters), the computing device may enable release of the container. To illustrate, the container may be released into the mail stream (in implementations used in post offices) or may be released into a group of containers for shipping (in implementations used by shipping companies), as non-limiting examples. If the composite signature does not match the stored composite signatures, the computing device may adjust an aspect of the release, such as an amount of materials being included in the container, or may pause or stop the release. Thus, the computing device may control release of the container based on measurements that are more quickly and accurately determined than if a human being individually measured the container.

The computing device may use machine learning techniques for determining compliance of a container with one or more stored composite signatures (or stored parameters). The stored composite signatures (or stored parameters) may be based on characteristics of approved containers, and thus compliance with the stored composite signatures (or stored parameters) indicates that a container is within the specifications of an approved container. The machine learning techniques may be used to identify a set of stored parameters or a composite signature corresponding to a container being analyzed and to determine whether indicia captured from a container belong to a category of indicia of the stored composite signatures. In some implementations, a random forest model may be trained to identify whether the indicia match indicia corresponding to one or more stored composite signatures (or stored parameters). Thus, indicia on a container may be identified using machine learning techniques performed by a computing device, instead of by hand, which can lead to user error.

In a particular aspect, a system for measuring characteristics of a container includes an edge device including a first sensor configured to generate weight data indicating a weight of a container. The edge device includes a second sensor, a third sensor, or both configured to generate first image data of dimensions of the container. The edge device includes a fourth sensor configured to generate second image data of a particular side of the container. The edge device also includes a processor coupled to the first sensor, the second sensor, the third sensor, and the fourth sensor and configured to determine dimension data based on the first image data. The edge device further includes a network interface configured to transmit the weight data, the dimension data, and the second image data as container information to a computing device. The system further includes the computing device. The computing device includes a second processor that is configured to determine whether the container complies with one or more stored composite signatures based on a composite signature generated from the container information derived by the edge device.

In another particular aspect, an apparatus for determining compliance of a container with stored composite signatures includes a network interface configured to receive, from an edge device, container information corresponding to a container. The container information includes one or more of dimension information, weight information, and image information. The apparatus also includes a processor coupled to the network interface. The apparatus further includes a memory coupled to the processor. The memory stores instructions that, when executed by the processor, cause the processor to generate a composite signature corresponding to the container based on the container information. The composite signature includes one or more of dimensions of the container, a weight of the container, and indicia of the container. The instructions cause the processor to access a database to identify one or more stored composite signatures corresponding to the composite signature. The one or more stored composite signatures correspond to one or more containers. The instructions also cause the processor to compare the composite signature to one or more stored composite signatures to determine whether the composite signature is in compliance with the one or more stored composite signatures. The instructions further cause the processor to control a process to manage a release of the container based on whether the composite signature is in compliance with the one or more stored composite signatures.

In another particular aspect, a method for determining compliance of a container with stored composite signatures includes receiving, at a processor from an edge device, container information corresponding to a container. The container information includes one or more of dimension information, weight information, and image information. The method includes generating, at the processor, a composite signature corresponding to the container based on the container information. The composite signature includes one or more of dimensions of the container, a weight of the container, and indicia of the container. The method includes accessing, at the processor, a database to identify one or more stored composite signatures corresponding to the composite signature. The one or more stored composite signatures correspond to one or more other containers. The method also includes comparing, at the processor, the composite signature to one or more stored composite signatures to determine whether the composite signature is in compliance with the one or more stored composite signatures. The method further includes controlling, by the processor, a process to manage a release of the container based on whether the composite signature is in compliance with the one or more stored composite signatures.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the implementations illustrated in greater detail in the accompanying drawings, wherein.

Figure 1:
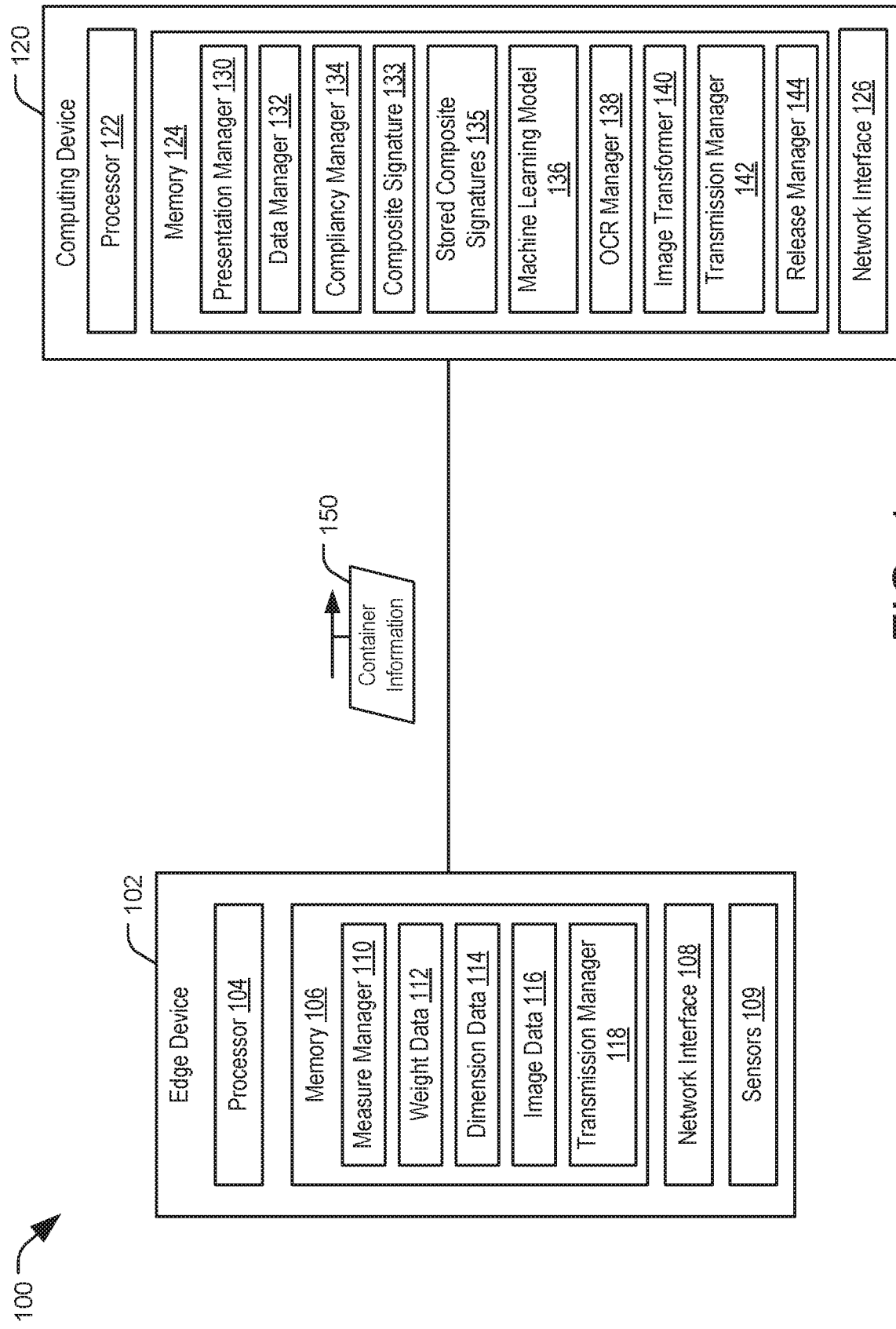
FIG. 1 is a block diagram of an example of a system for detecting compliance of a container with one or more composite signatures in accordance with the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The systems and methods disclosed herein provide techniques for determining compliance of a container with stored composite signatures or stored parameters. The solutions provided by the present disclosure facilitate measuring characteristics of a container (e.g., an envelope, flat, package, box, etc.), generating a composite signature based on the measurements, comparing the composite signature to stored composite signatures (or comparing parameters to stored parameters), and controlling a process to release the container based on the comparison. For example, the release of the container may be enabled (e.g., the container may be authorized to enter a mail stream), disabled (e.g., the container may be held or prevented from entering a mail stream), or modified (e.g., an amount charged for release of the container may be increased) based on whether the composite signature (or the parameters) of the container matches one or more stored composite signatures (or the stored parameters). Thus, the control of the release of a set of containers may be controlled based on sensor-based measurements which are faster and more accurate than human performed measurements.

In a particular implementation, release of a set of containers corresponds to a bulk mailing campaign. In such implementations, a measuring device (e.g., an edge device) may be used by a mail service employee to measure characteristics of an envelope or a package (e.g., a container) of the bulk mailing campaign. Based on the measured characteristics, a computing device may control the bulk mailing campaign by enabling the campaign, pausing or disabling the campaign, changing the logo imprinted on the envelope or package, changing the amount of paper included in the envelope or package, or other modifications. Additionally, or alternatively, if the envelope or package is non-compliant, an additional charge may be applied before the envelope or package is released into the mail stream. Thus, a bulk mailing campaign may be spot-checked for compliance using modular, easy-to-use equipment that fits within a mail service employee's work station, for example. Although described with respect to a bulk mailing campaign, in other implementations, the systems and methods described herein can be used for controlling the release of other sets of containers, such as food products containers, manufacturing containers, agriculture containers, and other types of containers that may be shipped, transported, or stored.

Referring to FIG. 1, a block diagram of a system 100 for detecting compliance of a container with one or more composite signatures (or stored parameters) in accordance with the present disclosure is shown. As shown in FIG. 1, system 100 may include an edge device 102 (e.g., a measuring device) and a computing device 120.

Edge device 102 can include a variety of components, including a processor 104, a memory 106, a network interface 108, and sensors 109. Processor 104 may be configured to execute instructions stored at memory 106 to perform the operations described herein. Processor 104 may include a central processing unit (CPU), a graphics processing unit (GPU), one or more field programmable gate arrays (FPGAs), one or more application specific integrated circuits (ASICs), or a combination thereof. Memory 106 may include a read-only memory (ROM), a random-access memory (RAM), a storage device, such as a flash device, a solid-state storage device, a disk drive, or another type of storage device, or a combination thereof.

Memory 106 may include measure manager 110, weight data 112, dimension data 114, image data 116, and transmission manager 118. Although described as being included in memory 106, in some implementations, one or more of components 110-118 may be combined or may be optional. Measure manager 110 may include instructions for managing sensors 109 to generate weight data 112, dimension data 114, and/or image data 116, as further described herein. For example, measure manager 110 may be executable by processor 104 to activate one or more of sensors 109 to generate corresponding sensor data when a container is placed within a receptacle of edge device 102. Transmission manager 118 may include instructions for transmitting weight data 112, dimension data 114, and image data 116 to computing device 120. For example, transmission manager 118 may be executable by processor 104 to enable network interface 108 to transmit information to computing device 120, as further described herein.

Network interface 108 is configured to transmit data to one or more other devices, to receive data from one or more other devices, or both. For example, network interface 108 may include a transmitter, a receiver, and/or a transceiver. To illustrate, network interface 108 may transmit and receive data, via a network, such as a wired network, a wireless network, or a combination thereof. For example, edge device 102 may be configured to transmit or receive data via a direct device-to-device connection, a local area network (LAN), a wide area network (WAN), a modem-to-modem connection, the Internet, an intranet, an extranet, a cable transmission system, a cellular communication network, any combination of the above, or any other communications network now known or later developed which permits two or more electronic devices to communicate.

Sensors 109 include multiple types of sensors configured to generate information about a container. For example, sensors 109 may include camera(s), a scale, an ultrasound sensor, a radio frequency (RF) sensor, an infrared sensor, an x-ray sensor, a millimeter (mm) wave sensor, or a combination thereof, that are configured to measure dimensions of the container, measure a weight of the container, capture images of a particular side of the container that include indicia, or a combination thereof. Additional aspects of the functionality provided by sensors 109 are described herein with reference to FIG. 2.

Computing device 120 includes a processor 122, a memory 124, and a network interface 126. Processor 122 may be configured to execute instructions stored at memory 124 to perform the operations described herein. Processor 122 may include a CPU, a GPU, one or more FPGAs, one or more ASICs, or a combination thereof. Memory 124 may include a ROM, a RAM, a storage device, such as a flash device, a solid-state storage device, a disk drive, or another type of storage device, or a combination thereof.

Memory 124 may include presentation manager 130, data manager 132, compliancy manager 134, machine learning model 136, optical character recognition (OCR) manager 138, image transformer 140, transmission manager 142, and release manager 144. Although described as being included in memory 124, in some implementations, one or more of components 130-144 may be combined or may be optional. Presentation manager 130 may include instructions for managing a display of information related to the container measured by edge device 102. For example, processor 122 may execute presentation manager 130 to generate a GUI, as further described with reference to FIG. 4. Data manager 132 may include instructions for managing and processing data received from edge device 102. For example, processor 122 may execute data manager 132 to determine dimensions or weight of the container based on information received from edge device 102. Compliancy manager 134 may include instructions for determining compliancy of the container with one or more stored composite signatures. For example, processor 122 may execute compliancy manager 134 to generate a composite signature 133 for the container based on data from data manager 132 and to compare the composite signature to stored composite signatures 135 to determine if there is a match. A match indicates compliancy, while no match indicates non-compliancy. Additionally or alternatively, compliancy manager 134 may include instructions for generating parameters for the container based on data from data manager 132 and for comparing the generated parameters to stored parameters for determining compliance. Machine learning model 136 may include a machine learning model that is generated to identify indicia that matches indicia of one or more stored composite signatures 135. For example, machine learning model 136 may be executed by processor 122 (as part of execution of compliancy manager 134) in determining compliance of the container, as further described herein. OCR manager 138 may include instructions for performing OCR on text of indicia of the container, for use in comparison to text in indicia of one or more stored composite signatures 135. For example, OCR manager 138 may be executed by processor 122 (as part of execution of compliancy manager 134) in determining compliance of the container, as further described herein. Image transformer 140 may include instructions to transform an image received from edge device 102 into a format that is usable for generating composite signature 133. For example, processor 122 may execute image transformer 140 to resize, rotate, de-skew, or perform other operations on one or more images. Transmission manager 142 may include instructions for receive information from edge device 102. For example, processor 122 may execute transmission manager 142 to enable network interface 126 to receive information from edge device 102. Release manager 144 may include instructions for managing a release of one or more containers. For example, processor 122 may execute release manager 144 to control the release of a measured container, as further described herein.

Network interface 126 is configured to transmit data to one or more other devices, to receive data from one or more other devices, or both. For example, network interface 126 may include a transmitter, a receiver, and/or a transceiver. To illustrate, network interface 126 may transmit and receive data, via a network, such as a wired network, a wireless network, or a combination thereof. For example, computing device 120 may be configured to transmit or receive data via a direct device-to-device connection, a LAN, a WAN, a modem-to-modem connection, the Internet, an intranet, an extranet, a cable transmission system, a cellular communication network, any combination of the above, or any other communications network now known or later developed with permits two or more electronic devices to communicate.

In some implementations, computing device 120 may further include a display device configured to display a user interface. The user interface may indicate whether a composite signature is in compliance with one or more stored composite signatures 135, as further described herein. The display device may be a monitor, a touch screen, a liquid crystal display (LCD) screen, or any other type of display device.

During operation, edge device 102 measures characteristics of a container placed within a receptacle of edge device 102. For example, sensors 109 generate weight data 112, dimension data 114, and/or image data 116 based on the container. Weight data 112 indicates a weight of the container. Dimension data 114 indicates dimensions of the container, such as a length, a width, and a height (e.g., a thickness). Image data 116 includes one or more images of one or more indicia located on one or more sides of the container. The indicia can include a logo, an address block, additional text, or other indicia. Edge device 102 may bundle weight data 112, dimension data 114, and/or image data 116 together as container information 150 and transmit container information 150 to computing device 120. Alternatively, weight data 112, dimension data 114, and/or image data 116 may be transmitted to computing device separately by edge device 102.

In some implementations, a user places the container on a receptacle of edge device 102 for measuring characteristics of a container. The receptacle of edge device 102 may include one or more markings to indicate how the container should be oriented and/or where the container should be placed within the receptacle. In other implementations, edge device 102 is configured to automatically receive containers for measuring. For example, edge device 102 may be placed between conveyors, or other means of motion, of a container sorting system and be configured to measure the characteristics of the containers as they pass and are received in a receptacle of edge device 102. After being measured, compliant containers may be released to continue traversing the system. In still other implementations, only some of the containers of a container release are measured, and the rest are left unmeasured.

Computing device 120 receives container information 150 and processes container information 150 to generate a weight, dimensions, images of indicia, or a combination thereof. Generating the images of the indicia may include transforming one or more received images, such as rotating the one or more received images, resizing the one or more received images, de-skewing the one or more received images, and/or performing other image transformation operations on the one or more received images. In some implementations, computing device 120 generates composite signature 133 based on the weight, the dimensions, the images of the indicia, or a combination thereof. Composite signature 133 may be a value based on or derived from the weight, the dimensions, and/or the images, such as a hash value or a string derived from the container information, as non-limiting examples. Computing device 120 then compares composite signature 133 to one or more stored composite signatures 135 to determine whether the container measured by edge device 102 is compliant. For example, computing device 120 may access a database that stores one or more stored composite signatures 135. The database may be stored in memory 124 or may be stored externally and may be accessible to computing device 120. Each of the one or more stored composite signatures 135 stored at the database may correspond to one or more containers (e.g., approved containers). In some other implementations, computing device may determine the parameters of the container (e.g., the dimensions, the height, the indicia, etc.) and compare the generated parameters to stored parameters that correspond to one or more containers (e.g., approved containers). This comparison may be performed without generating a composite signature derived from the parameters.

Compliancy of the container may be determined based on the comparison. For example, if composite signature 133 (or the generated parameters) matches one of stored composite signatures 135 (or the stored parameters), the container may be determined to be compliant. If the composite signature 133 (or the generated parameters) does not match any of stored composite signatures 135 (or the stored parameters), the container may be determined to be non-compliant. A composite signature matches a stored composite signature when the corresponding measurements (or indicia) are substantially equal to (e.g., within a particular tolerance range, such as 1, 2, or 5 cm for dimension and height measurements, as non-limiting examples) corresponding measurements (or indicia) of a stored composite signature. For example, composite signature 133 is in compliance with one or more stored composite signatures 135 when the dimensions of the container substantially match dimensions of the one or more other containers (e.g., within 1, 2, or 5 cm as non-limiting examples), when the weight of the container matches a weight of one of the one or more other containers (within 1, 5, or 10 grams as non-limiting examples), when the indicia of the container substantially match indicia of one of the one or more other containers (within 1, 2, or 5 letters, 1, 2, or 5 cm of location, or 1, 2, or 3% ink resolution, as non-limiting examples, or a combination thereof.

In some implementations, OCR may be performed on container information 150 (e.g., on image data 116) to recognize text in one or more indicia in the image. The text may be compared to text of stored composite signatures 135 to determine compliance of the container measured by edge device 102. For example, if the text in the images provided by edge device 102 is the same as text corresponding to a stored composite signature, a match may be identified. If the text does not match the text of any of stored composite signatures 135, no match may be identified (e.g., the container may be determined to be non-compliant). Additionally, or alternatively, comparing composite signature 133 to one or more stored composite signatures 135 may include comparing sizes of the one or more indicia, locations of the one or more indicia, shapes of the one or more indicia, text of the one or more indicia, or a combination thereof, to corresponding features of indicia corresponding to one or more stored composite signatures 135. For example, the image data 116 of container information 150 may be processed and sizes, shapes, locations, etc. of the one or more indicia may be compared to sizes, shapes, locations, etc. of indicia of one or more stored composite signatures 135 as part of the comparison process.

Based on the comparison of composite signature 133 (or the generated parameters) to stored composite signatures 135 (or stored parameters), computing device 120 may control a process to manage a release of the container. For example, computing device 120 may be configured to manage a release of the container, and based on the comparison, the release may be controlled. As non-limiting examples, controlling the process to manage the release of the container may include adjusting an amount or size of items held by the container, adjusting the indicia based on the one or more stored composite signatures, and/or stopping the release of the container. Additionally, or alternatively, modifying or adjusting the release may include charging an additional amount for a non-compliant container before releasing the non-compliant container. It is noted that when an additional amount is charged for a non-compliant container, one or more marks may be applied to the container to indicate the additional amount has been charged (e.g., to provide an indication the container is compliant due to the additional amount that was charged).

In addition to controlling the process to release the container, computing device 120 may generate a graphical user interface (GUI) for display to a user. The GUI may include an indication of whether composite signature 133 (or the generated parameters) is in compliance with stored composite signatures 135 (the stored parameters), as well as dimensions of the container, the weight of the container, an image of one or more indicia on a particular side of the container, or a combination thereof. The GUI may also indicate relationships between measurements of the container and the one or more other containers, error messages, and other information, as further described with reference to FIG. 4.

In some implementations, machine learning model 136 is used to predict a category (e.g., a particular composite signature) to which the container corresponds based on one or more images of the container. Machine learning model 136 may be an image classification model that is trained based on a number of images, such as 3000 images as a non-limiting example. In a particular implementation, machine learning model 136 is a random forest model. In other implementations, machine learning model 136 can be other types of machine learning models, such as other types of classifiers, regression models, or other types of machine learning models. Machine learning model 136 may operate on images of a particular side of a container that include one or more indicia.

Machine learning model 136 may be trained based on training data, such as 3000 images of containers with indicia, as a non-limiting example. Training machine learning model 136 may include receiving a set of training labels, sorting the set of training labels, looping over images of the training data, resizing each image of the training data to a fixed size, calculating features for each image of the training data, scaling the features for each image of the training data, training machine learning model 136 based on the features, and storing machine learning model 136 in memory 124. In some implementations, the training data is stored hierarchically, such as in folders and sub-folders. Once machine learning model 136 has been trained, machine learning model 136 can be used to predict a category of a container. For example, machine learning model 136 may be loaded at program startup, an image to be categorized (e.g., classified) is resized, features (e.g., histogram and moments) of the image are calculated, the features are scaled in a particular range, such as (0-1), and machine learning model 136 is applied to predict the probability that the image (e.g., the container) is classified as corresponding to a particular composite signature. Additionally, or alternatively, machine learning model 136 may be trained to identify a category that a container belongs to based on other features (e.g., besides features of an image), such as shapes, colors, or other features of the container. Thus, comparing composite signature 133 to one or more stored composite signatures 135 includes applying machine learning model 136 to composite signature 133 and one or more stored composite signatures 135.

Use of machine learning model 136 as part of the process of comparing composite signature 133 to stored composite signatures 135 enables comparisons that would not otherwise be performed by humans. For example, humans may subjectively look at a container and compare the container to an image of a container as part of a comparison process. Such comparison is time consuming and prone to user error. Using machine learning model 136 determines features of indicia that would not be determined by a human and compares the features to features of indicia corresponding to stored composite signatures 135. This process is more accurate and compares more features than a subjective process performed by a human. Machine learning model 136 may represent a series of rules for performing such comparisons, and such rules are not followed by humans when performing a subjective comparison. Thus, the comparison of composite signature 133 to stored composite signatures 135 represents a new process not previously performed by humans.

Although described as two separate devices, in other implementations, edge device 102 and computing device 120 may be a single device. For example, edge device 102 may include sufficient processing resources (e.g., processors and memory providing the functionality described in connection with computing device 120) to generate composite signature 133 and compare composite signature 133 to stored composite signatures 135. Edge device 102 may also include a display device configured to output a GUI, as further described with reference to FIG. 4. Alternatively, edge device 102 and computing device 120 may be distinct devices, as described above.

In some implementations, system 100 may be a postal measuring system used by postal service employees of a postal service provider, and the process of releasing the containers may be associated with providing (e.g., releasing) containers generated as part of a bulk mailing process or campaign into a mail stream operated by the postal service provider. For example, an entity (e.g., an individual or company) may contact the postal service provider to configure a bulk mailing campaign, such as to specify the type of container (e.g., a card, envelope, flat, box, etc.) to be used for the bulk mailing campaign, contents of the bulk mailing campaign (e.g., text, graphics, inserts, and the like) to be displayed on the container and/or contents disposed within the container (e.g., inserts), cost information, targets to receive containers as part of the bulk mailing campaign (e.g., geographic areas where the containers are to be distributed, demographic information associated with intended recipients of the containers as part of the bulk mailing campaign, etc.), and other information. As part of the configuration process, a sample container may be created and approved by the entity and a composite signature (e.g., one of the one or more composite signatures 135) or set of parameters for the bulk mailing campaign may be generated and stored as described above. Once the bulk mailing campaign is configured, the postal service provider may begin generating the containers according to the specifications provided by the entity.

To verify that an envelope or package is compliant with the specifications of the bulk mailing process or campaign, a postal service employee may deposit a container generated for the bulk mailing campaign in a receptacle of edge device 102, and edge device 102 may generate weight data 112, dimension data 114, and image data 116 using sensors 109. Alternatively, the envelope or package (e.g., a container) may be automatically deposited in the receptacle as part of a process for delivering the generated containers to a mail sorting system, such as to periodically inspect the containers to verify aspects of the process for generating the containers are producing containers that comply with the specifications provided by the entity, which may be represented by the composite signature or stored parameters. The data generated by the edge device 102 may be sent to computing device 120 as container information 150. Computing device 120 generates composite signature 133 (or generated parameters) based on container information 150 and compares composite signature 133 (or the generated parameters) to stored composite signatures 135 (or stored parameters), as described above. If a match is detected, the envelope or package (e.g., container) is determined to meet the specifications of the bulk mailing campaign, and the bulk mailing campaign may continue without modification. If no match is detected, the bulk mailing campaign may be modified, such as be reducing the amount of materials (e.g., inserts, etc.) included in the envelopes or packages, modifying a characteristic of an indicia on the envelopes or packages, altering the handling needs of the packages, requiring additional payment for handling the campaign, or stopping/delaying the bulk mailing process, as non-limiting examples. In this manner, a postal service employee is able to quickly and easily determine whether an envelope or package meets the specifications of a bulk mailing campaign without performing slow and error-prone manual measurements, or making a determination based on a picture of the envelope or the package. Additionally, being able to quickly and accurately determine compliance of an envelope or package with bulk mailing specifications may prevent monetary losses due to mailing envelopes or packages that exceed the specifications.

In some implementations, system 100 may be used by a third party company (e.g., a company that is not a postal service provider) that is contracted (e.g., by the entity described in the exemplary scenario immediately above) to generate materials for bulk mailing campaigns, such as coupon books, as a non-limiting example. In such implementations, edge device 102 may be used to measure characteristics of containers prior to the third party company delivering the containers generated for the bulk mailing campaign to a mail stream (e.g., a mail stream provided by a postal service provider). If the characteristics do not match stored characteristics (or if composite signature 133 generated based on the characteristics does not match stored composite signatures 135), generation of additional mailing materials may be halted and modifications to the process may be made. For example, if the ink of the indicia does not match stored indicia (e.g., incorrect color, incorrect intensity due to low ink/toner, etc.) or the composite signature or parameters do not match the stored composite signature (or parameters) for some other reason (e.g., improper weight, length, width, height, etc.), the process of generating the containers for the bulk mailing campaign may be halted to replace an ink or toner cartridge. As another example, if the indicia is skewed (or misaligned) as compared to the stored indicia, a printing process may be halted and an input receptacle (e.g., for providing paper to a printer) may be adjusted such that the printing of the indicia is no longer skewed (or misaligned) so as to prevent generation of further non-compliant indicia on other containers. It is noted that the examples described above are provided for illustrative purposes only and are not to be construed as limiting the present disclosure. If the characteristics do match the stored characteristics (or if composite signature 133 matches one of stored composite signatures 135), the mailing materials may be released into a collection of mailing materials ready for mailing.

Although described in the context of a bulk mailing campaign, system 100 is not so limited. In other implementations, system 100 may be used to determine whether containers of produce meet specifications before being released to a store. For example, the containers may have certain size and weight requirements, or certain indicia requirements, and a determination whether these requirements are met can be made by generating a composite signature and comparing the composite signature to stored composite signatures (or comparing derived and stored parameters). As another example, products to be stored in a warehouse may have certain size requirements in order to fit in the storage shelves. System 100 may be able to determine whether a product will fit in the storage shelves before being sent to a particular location within the warehouse. Other implementations are also possible and are within the scope of the present disclosure.

Thus, system 100 enables determination of compliance of a container with stored composite signatures 135 (or parameters) using a simple, automated device to measure characteristics of the container. Edge device 102 is modular and relatively small, thus easy to fit at a work station of a postal service employee or adapted/integrated with a mail processing system (e.g., a mail sorting system) or other facility (e.g., a printing facility, etc.), as further described with reference to FIG. 2. Additionally, system 100 performs the measurements and comparisons without input from a user, leading to a more accurate determination of whether a container is compliant than if a user performed time consuming and error-prone manual measurements as well as allowing more containers to be validated against stored composite signatures or parameters in a given period of time.

Figure 2:
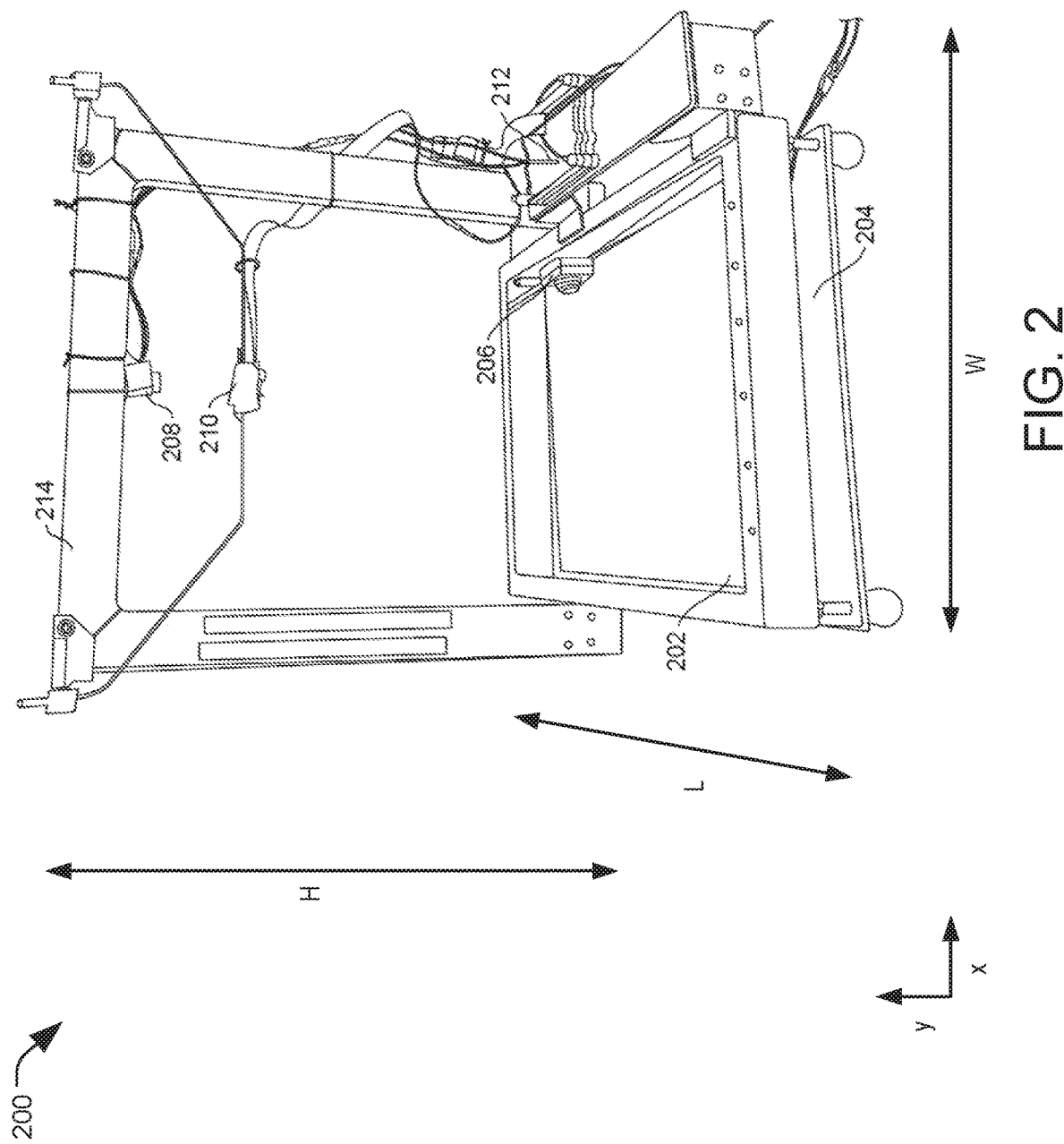
FIG. 2 is a diagram of an example of a device for measuring characteristics of a container in accordance with the present disclosure.

Referring to FIG. 2, a diagram of a device 200 for measuring characteristics of a container in accordance with the present disclosure is shown. Device 200 may also be referred to as a measuring device or an edge device. In some implementations, device 200 includes or corresponds to edge device 102 of FIG. 1. Device 200 includes a receptacle 202, a first sensor 204, a second sensor 206, a third sensor 208, a fourth sensor 210, a processor 212, and a frame 214. Receptacle 202 may be configured to receive a container for measuring. Frame 214 may be coupled to receptacle 202 and configured to support one or more other components of device 200.

First sensor 204 may be configured to generate weight data indicating a weight of a container placed in receptacle 202. For example, first sensor 204 may include a scale, such as a digital scale, configured to generate the weight data for the container.

Second sensor 206 may be configured to generate first image data of dimensions of the container within receptacle 202. For example, second sensor 206 may include a digital camera, such as a universal serial bus (USB) camera. Third sensor 208 may also be configured to generate first image data of dimensions of the container. For example, third sensor 208 may include an ultrasound sensor configured to generate ultrasound images of the container. As other examples, third sensor 208 may include an infrared sensor, a millimeter wave sensor, an x-ray sensor, a RF scanner, or other types of sensors. In some implementations, second sensor 206 may be used when the container has a height within a first range, and third sensor 208 may be used when the container has a height within a second range. For example, if the height of the container is less than or equal to a specified thickness, such as 2-3 cm, second sensor 206 may be used. If the height of the container is greater than the specified thickness, third sensor 208 may be used. Second sensor 206 may be better at generating information that can be used to determine small heights, while third sensor 208 may be better at generating information that can be used to determine larger heights. In some implementations, device 200 includes both second sensor 206 and third sensor 208. In other implementations, device 200 includes only one of either second sensor 206 or third sensor 208. For example, if device 200 is primarily to be used for measuring envelopes, third sensor 208 may not be included. As another example, if device 200 is primarily to be used for measuring packages, second sensor 206 may not be included.

Fourth sensor 210 may be configured to generate second image data of a particular side of the container. For example, fourth sensor 210 may include a camera, such as a high-definition camera, configured to generate image data of a particular side of the container. The particular side of the container may include one or more indicia, and thus the image data may include the one or more indicia. The one or more indicia may include logos, address blocks, text, or other indicia, as non-limiting examples.

Processor 212 is coupled to sensors 204-210 and configured to determine dimension data based on the first image data. For example, processor 212 may be configured to determine a length and width of the container based on the first image data, specifically based on the distance between the container and the edges of receptacle 202. Additionally, or alternatively, processor 212 may be configured to determine the height of the container based on the first image data. For example, processor 212 may be configured to determine the height based on an image from second sensor 206 or based on ultrasound data from third sensor 208. In alternate implementations, the image data is provided to a computing device (e.g., the computing device 120 of FIG. 1) and the computing device, not processor 212, determines the height. Device 200 may also include a network interface (not shown) configured to transmit the data generated by sensors 204-210 to a computing device, such as computing device 120 of FIG. 1.

In some implementations, device 200 further includes a reference marker coupled to an opposite side of receptacle 202 from second sensor 206. The reference marker is configured to enable determination of a thickness (e.g., height) of the container based on a comparison of the thickness to a reference marker. The reference marker is further described and illustrated with reference to FIG. 3.

Device 200 may be sized to enable portability and ease of use. For example, device 200 may be significantly smaller than typical postal measuring and processing systems. For example, device 200 may have a length L, a width W, and a height H. In some implementations, L may be substantially 39 cm, W may be substantially 37 cm, and H may be substantially 47 cm (e.g., device 200 may have a footprint of approximately 40 cm×40 cm×50 cm). Due to its small size, device 200 may easily fit within a work station of a user. Additionally, device 200 may be modular to improve portability and flexibility. For example, frame 214 may be detached from receptacle 202 to improve the portability of device 200. Additionally, a detachable platform may support processor 212. Thus, device 200 can be used in a multitude of places, including employee workstations, and can be moved with relative ease as compared to typical postal measuring and processing systems. Additionally, device 200 performs measurements of a container using an automated system, which is faster and more accurate than having an employee perform manual measurements of the container, thereby improving the measurement system and associated systems (e.g., mail sorting systems, etc.) by enabling the measurement process to keep up with the speed at which such associated systems operate.

Figure 3:
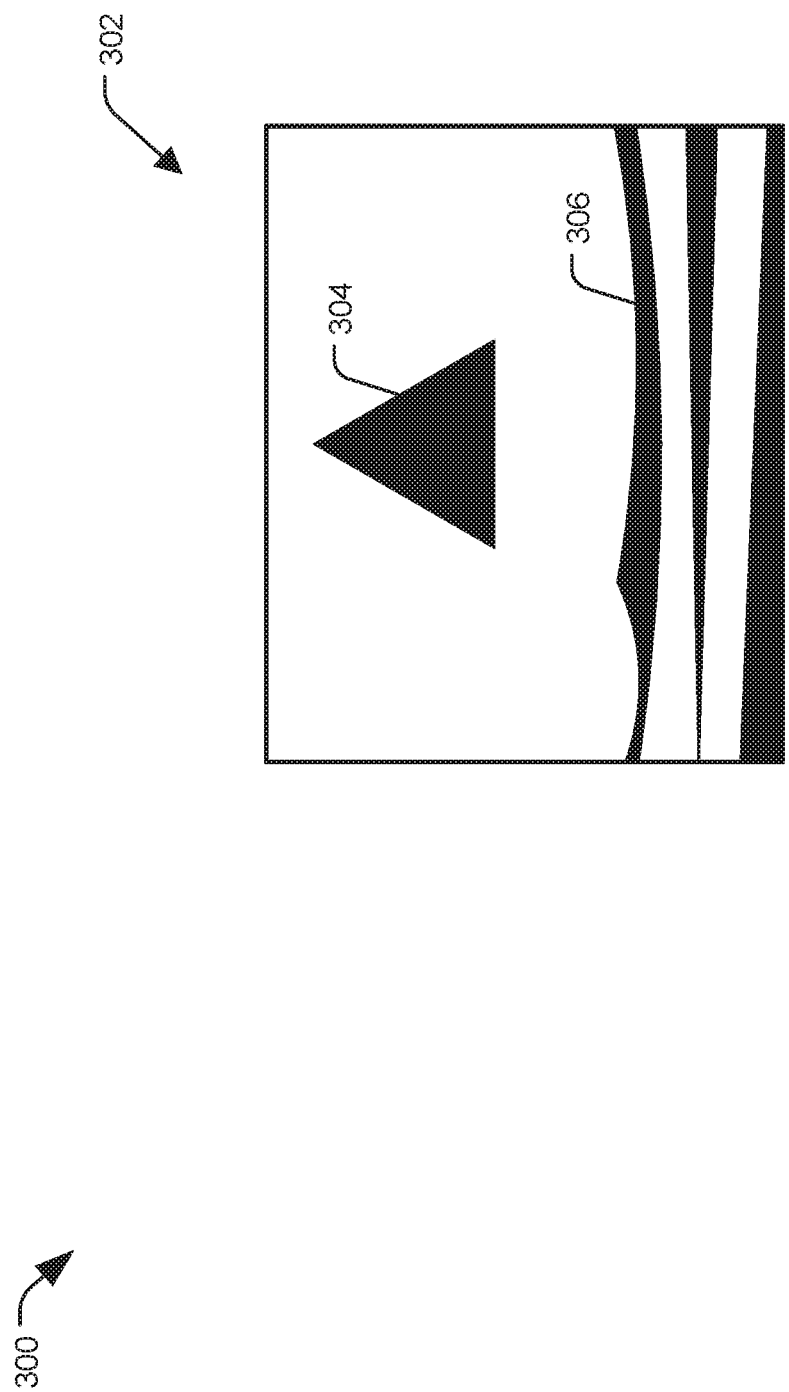
FIG. 3 is a diagram of a reference marker in accordance with the present disclosure.

Referring to FIG. 3, a diagram 300 of a reference marker in accordance with the present disclosure is shown. FIG. 3 includes a lateral image 302 of a container. In the implementation illustrated in FIG. 3, the container is an envelope. In other implementations, the container may be other types of containers, such as packages, bins, etc.

As shown in FIG. 3, a reference marker 304 is displaced on a surface of a receptacle of device 200 opposite from a surface upon which second sensor 206 is mounted. In the lateral image 302, container 306 (e.g., an envelope) is shown below reference marker 304. In some implementations, reference marker 304 includes a triangle that is situated a particular distance above a base (e.g., a receptacle), and thickness (e.g., height) of container 306 is determined based on a distance between the container 306 and a portion of the triangle. To illustrate, the distance may be determined based on a number of pixels between a top of container 306 and a bottom of the triangle. For example, when no container is present, an image may be taken of reference marker 304, and the number of pixels between the base (e.g., the receptacle) and the bottom of reference marker 304 may be determined. The pixels may be converted to a measurement in cm (or other units), such that when a container is present, the number of pixels between the top of the container and the bottom of reference marker 304 can be determined and quickly converted to a distance and used to determine the thickness (e.g., height) of the container. Using the measurements obtained based on the reference marker 304 provides an accurate way to rapidly approximate the thickness (e.g., height) of a container while requiring fewer processing resources than other techniques.

Additionally or alternatively, multiple reference markers (e.g., multiple triangles) may be disposed across from second sensor 206. In such implementations, a method of determining the thickness (e.g., height) of a container may include taking a lateral snapshot (e.g., an image), detecting the triangle(s) in the image using an application programming interface (API) call, determining the vertices of the triangle(s) from the previous API call, and calculating the height of the biggest triangle in the image. In other implementations, other types of reference markers may be used. For example, the reference markers may be other shapes than triangles, such as patterned lines or other markings. Alternatively, rulers or numbers may be applied (e.g., printed or applied via a sticker) on the background in view of second sensor 206 to enable quick determination of the thickness of container 306.

Figure 4:
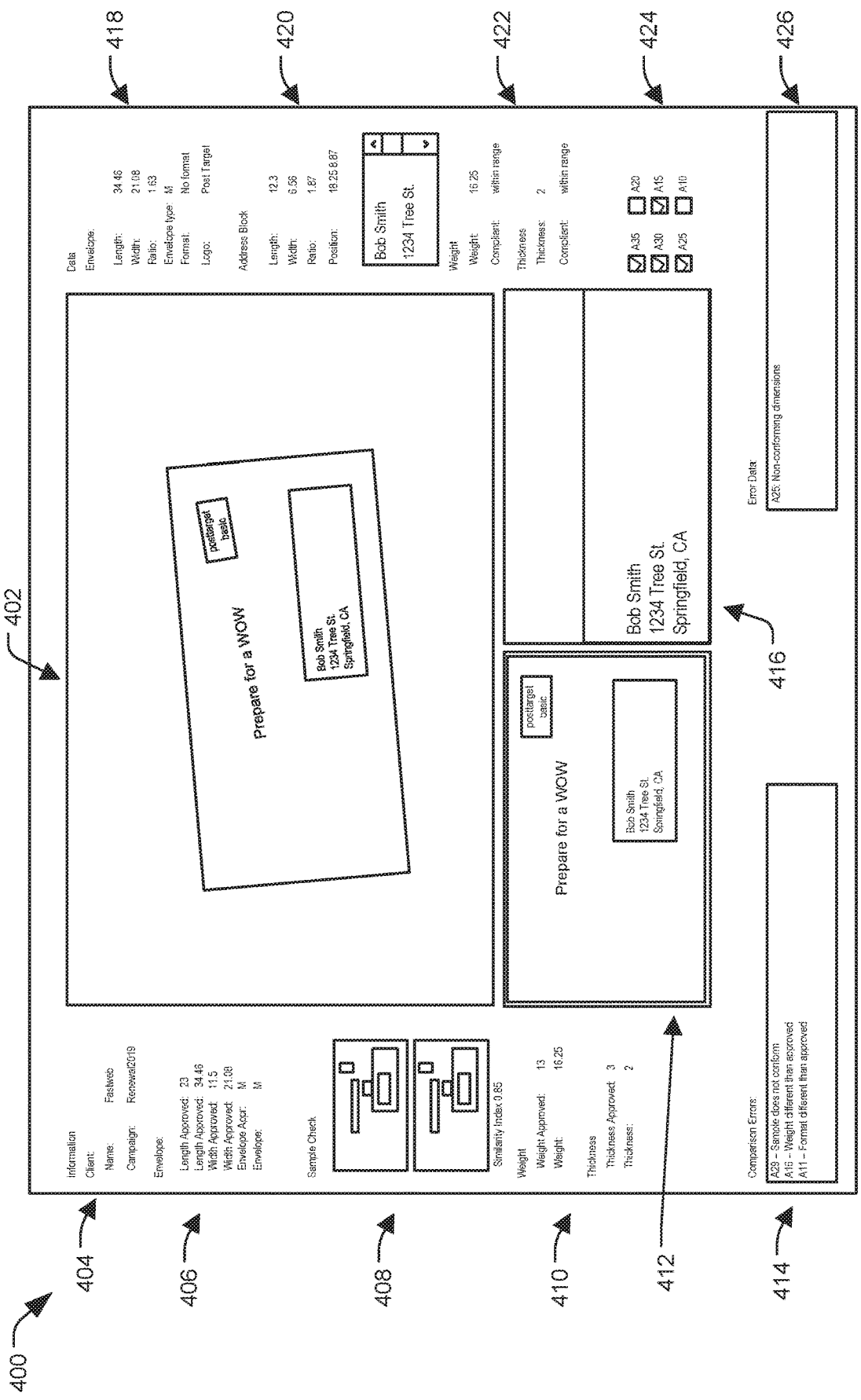
FIG. 4 is a screenshot of a GUI that indicates information about a container in accordance with the present disclosure.

Referring to FIG. 4, a screenshot of a GUI 400 that indicates information about a container in accordance with the present disclosure is shown. In some implementations, GUI 400 is generated by a computing device, such as computing device 120 of FIG. 1. In the implementation illustrated in FIG. 4, GUI 400 corresponds to a bulk mailing campaign and the container includes an envelope. In other implementations, GUI 400 may display information about other types of containers. GUI 400 includes a number of components, as described herein. In some implementations, the components may be combined or some may be optional. Thus, GUI 400 is not limited to the implementation illustrated in FIG. 4 and is instead intended to illustrate aspects of the operation and functionality that may be provided by GUI 400.

GUI 400 may include an image 402 of a container (e.g., an envelope). Image 402 may be received from an edge device, such as edge device 102 of FIG. 1 (as part of container information 150). Image 402 does not have any transformations performed on it, so in some cases the envelope may be rotated or skewed compared to the rest of GUI 400. Image 402 may be captured by a high-definition camera, such as fourth sensor 310 of FIG. 3.

GUI 400 may include customer and campaign information 404. In the example illustrated in FIG. 4, the customer name is "Fastweb" and the campaign name is "Renewal2019." In some implementations, customer and campaign information 404 may be determined based on a code in the image 402. Alternatively, the information (or the code) may be entered or selected by a user. GUI 400 may also include container information 406. In the example illustrated in FIG. 4, the container information 406 includes information indicating approved parameters, such as approved lengths, widths, and container types (e.g., envelope). It is noted that the exemplary approved parameters illustrated in container information 406 have been provided for purposes of illustration, rather than by way of limitation and that other container parameters may be shown in the container information 406 depending on the particular configuration of the system.

GUI 400 may include an image comparison and similarity index 408. The image comparison includes a comparison of image 402 (which may have one or more transformations applied to it) compared to an image corresponding to the stored composite signature for the campaign. Image comparison and similarity index 408 may visually indicate, on the images, areas of similarity using boxes or other markers. Image comparison and similarity index 408 also includes a display of a similarity index between image 402 and the image of the particular container corresponding to the stored composite signature. For example, based on similarities between transformed image 402 and the image corresponding to the campaign, GUI 400 indicates a similarity index of 0.85. The higher the similarity index, the more similar the envelopes (e.g., containers) are to each other.

GUI 400 may include a weight and thickness comparison 410. Weight and thickness comparison 410 includes a weight of the envelope being measured, an approved weight, a thickness (e.g., height) of the envelope, and an approved thickness. For example, as illustrated in FIG. 4, the envelope may have a weight of 16.25 grams and a thickness of 2 cm, as compared to an approved weight of 13 grams and 3 cm.

GUI 400 may include an areas of interest display 412. Areas of interest display may display a portion of image 402 containing areas of interest. In the example illustrated in FIG. 4, areas of interest display 412 includes an image of the envelope from image 402. One or more image transformations, such as rotation or skewing and resizing may be performed on the image in areas of interest display 412 to focus on areas of interest, such as indicia of the envelope (e.g., the address block, the text, and the postage block).

GUI 400 may include a first error display 414. First error display 414 may indicate errors in the envelope with respect to the envelope corresponding to the campaign (e.g., corresponding to the composite signature). For example, errors may include that the sample does not conform, that the weight is different than approved, that the format is different than approved, or other types of errors. These errors may enable a user to determine why an envelope is non-compliant with a composite signature (e.g., with an envelope corresponding to the campaign).

GUI 400 may include an address block view 416. Address block view 416 may include a resized image of the address block of the envelope from image 402. Additionally, OCR may be performed on the address block in address block view 416 so that the text may be processed, such as for comparison to a composite signature.

GUI 400 may include envelope parameters 418. Envelope parameters 418 may include dimensions of the envelope (e.g., length and width, and a ratio of length to width), envelope type, format, and logo type. In other implementations, other parameters may be included. For example, if in particular instances where packages or envelopes are abnormally shaped/sized, custom parameters may be utilized.

GUI 400 may include address block parameters 420. Address block parameters 420 include information such as the size of the address block, the position of the address block, and the text of the address block (from performance of OCR on the address block). In other implementations, other parameters may be included, such as a font of the address block, a text color of the address block, spacing of the address block, or other parameters.

GUI 400 may include weight and thickness data 422. Weight and thickness data 422 includes the weight of the envelope, the thickness of the envelope, whether the weight is compliant (e.g., within range), whether the thickness is compliant (e.g., within range), and/or other information. In other implementations, other information may be included.

GUI 400 may include compliance check controls 424. Compliance check controls 424 enable a user to select which aspects of compliance should be determined by GUI 400. For example, compliance check controls 424 may include one or more selectable indicators, each selectable indicator corresponding to a different aspect of compliance. By using compliance check controls 424, a user may select which aspects of compliance to be checked for by the system.

GUI 400 also may include a second error display 426. Second error display 426 indicates which of the selected compliance controls (e.g., via compliance check controls 424) returned an error. In the example of FIG. 4, compliance control A25 returned an error because there are non-conforming dimensions. Other errors that can be automatically detected and indicated include incorrect position block address, incorrect address label size, incorrect address block features, unsuitability of the envelope, copies with generic zip code, incorrect address label size, mail without logo and authorization, weight exceeding that contemplated by the product price list, sample shipment not conforming to approved copy, certified copy not present in database, measured weight different from that declared by customer, format different from the declared format, shipments with non-homogeneous consignments, or other errors.

Thus, GUI 400 presents a user with a variety of information regarding a measured envelope. For example, GUI 400 indicates the dimensions (e.g., length and width), the weight, and the thickness of the envelope. Additionally, GUI 400 displays areas of interest based on an image of the envelope. GUI 400 further indicates compliance (or non-compliance) of the envelope with a stored envelope for the campaign (e.g., via comparing composite signatures). Although described as displaying information for envelopes and mailing campaigns, in other implementations, GUI 400 may display information related to compliance of any type of container.

Figure 5:
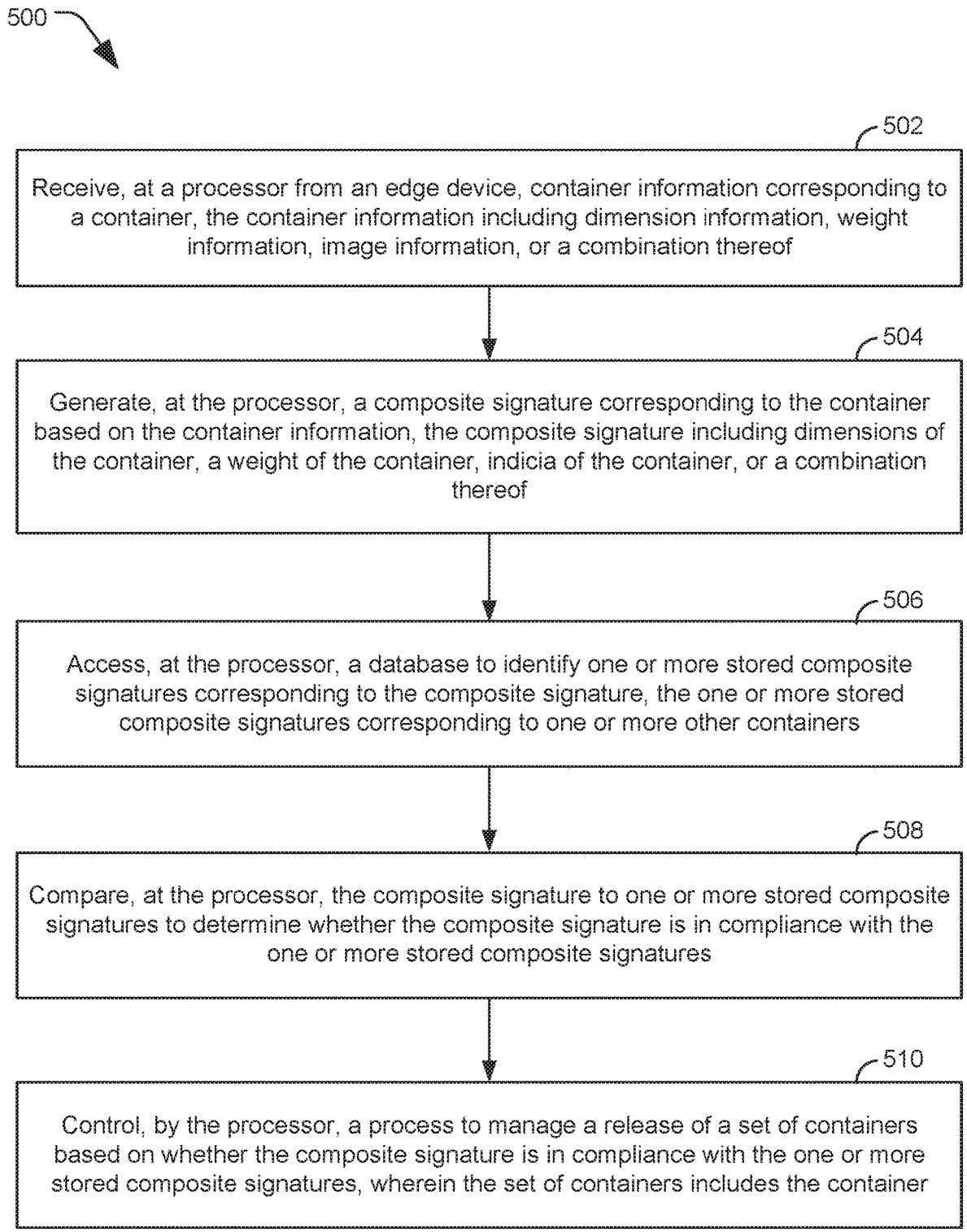
FIG. 5 is a flow diagram of an exemplary method for detecting compliance of a container with composite signatures in accordance with the present disclosure.

Referring to FIG. 5, a flow diagram of a method 500 of detecting compliance of a container with composite signatures in accordance with the present disclosure is shown. In some implementations, method 500 may be performed by computing device 120 of FIG. 1. For example, steps of method 500 may be stored as instructions (e.g., the instructions described above with reference to FIG. 1) that may be executed by one or more processors (e.g., the one or more processors described above with reference to FIG. 1, such as the one or more processors of computing device 120).

Method 500 includes receiving, at a processor from an edge device, container information corresponding to a container, at 502. The container information includes dimension information, weight information, image information, or a combination thereof. For example, computing device 120 may receive container information 150 from edge device 102. Container information 150 may include weight data 112, dimension data 114, image data 116, or a combination thereof.

Method 500 includes generating, at the processor, a composite signature corresponding to the container based on the container information, at 504. The composite signature includes dimensions of the container, a weight of the container, indicia of the container, or a combination thereof. For example, computing device 120 may generate composite signature 133 based on container information 150.

Method 500 includes accessing, at the processor, a database to identify one or more stored composite signatures corresponding to the composite signature, at 506. The one or more stored composite signatures correspond to one or more other containers. For example, computing device 120 may access a database to identify stored composite signatures 135. In some implementations, the database may be stored in a memory of the computing device (e.g., memory 124). In some other implementations, the database may be external to computing device 120 and accessible to computing device 120.

Method 500 also includes comparing, at the processor, the composite signature to one or more stored composite signatures to determine whether the composite signature is in compliance with the one or more stored composite signatures, at 508. For example, computing device may compare composite signature 133 to stored composite signatures 135 to determine whether composite signature 133 is in compliance with stored composite signatures 135.

Method 500 further includes controlling, by the processor, a process to manage a release of a set of containers based on whether the composite signature is in compliance with the one or more stored composite signatures, at 510. The set of containers includes the container. For example, computing device 120 may control a process to manage a release of a set of containers based on the comparison of composite signature 133 to stored composite signatures 135.

In some implementations, controlling the process to manage the release of the set of containers includes adjusting an amount or size of items held by the container, or adjusting the indicia based on the one or more stored composite signatures, or stopping the release of the set of containers. For example, in implementations where the container is an envelope that is part of a bulk mailing campaign, controlling the process may include adjusting the amount of paper included in the envelope, adjusting an indicia printing process, or stopping the bulk mailing campaign, as non-limiting examples.

In some implementations, method 500 further includes generating a GUI that includes an indication of whether the composite signature is in compliance with the one or more stored composite signatures and the dimensions of the container, the weight of the container, and image of one or more or more indicia on a particular side of the container, or a combination thereof. For example, GUI 400 may indicate whether an envelope is in compliance with a stored composite signature as well as dimension information, weight information, and images of the envelope including indicia. In some such implementations, the GUI further includes a display of a similarity index between an image of the container and an image of a particular container corresponding to one of the one or more stored composite signatures. For example, GUI 400 may include image comparison and similarity index 408. Additionally, or alternatively, the GUI further includes an indication of one or more errors when the composite signature is not in compliance with the one or more stored composite signatures. For example, GUI 400 may include first error display 414.

In some implementations, method 500 further includes performing OCR on one or more indicia included in an image of the image information to determine text on a particular side of the container and comparing the text to text included in the one or more stored composite signatures. For example, generating composite signature 133 may include performing OCR on image data received from edge device 102 to determine text on the container, and comparing the text to text corresponding to stored composite signatures 135.

In some implementations, method 500 further includes training a machine learning model based on training data. Training the machine learning model includes receiving a set of training labels, sorting the set of training labels, looping over images in the training data, resizing each image of the training data to a fixed size, calculating features for each image of the training data, scaling the features for each image of the training data, training the machine learning model based on the features, and storing the machine learning model in a memory. For example, machine learning model 136 may be trained based on training data and stored at memory 124 for use in determining compliance of a container. In some such implementations, comparing the composite signature to the one or more stored composite signatures includes applying the machine learning model to the composite signature and the one or more stored composite signatures. The machine learning model may include a random forest model. For example, comparing composite signature 133 to stored composite signatures 135 may include executing machine learning model 136 on composite signature 133 and stored composite signatures 135.

Thus, method 500 enables determination of compliance of a container with stored composite signatures using measurements performed by a system. Because a user does not have to manually measure the container, a faster and more accurate determination of whether a container is compliant is provided.

Figure 6:
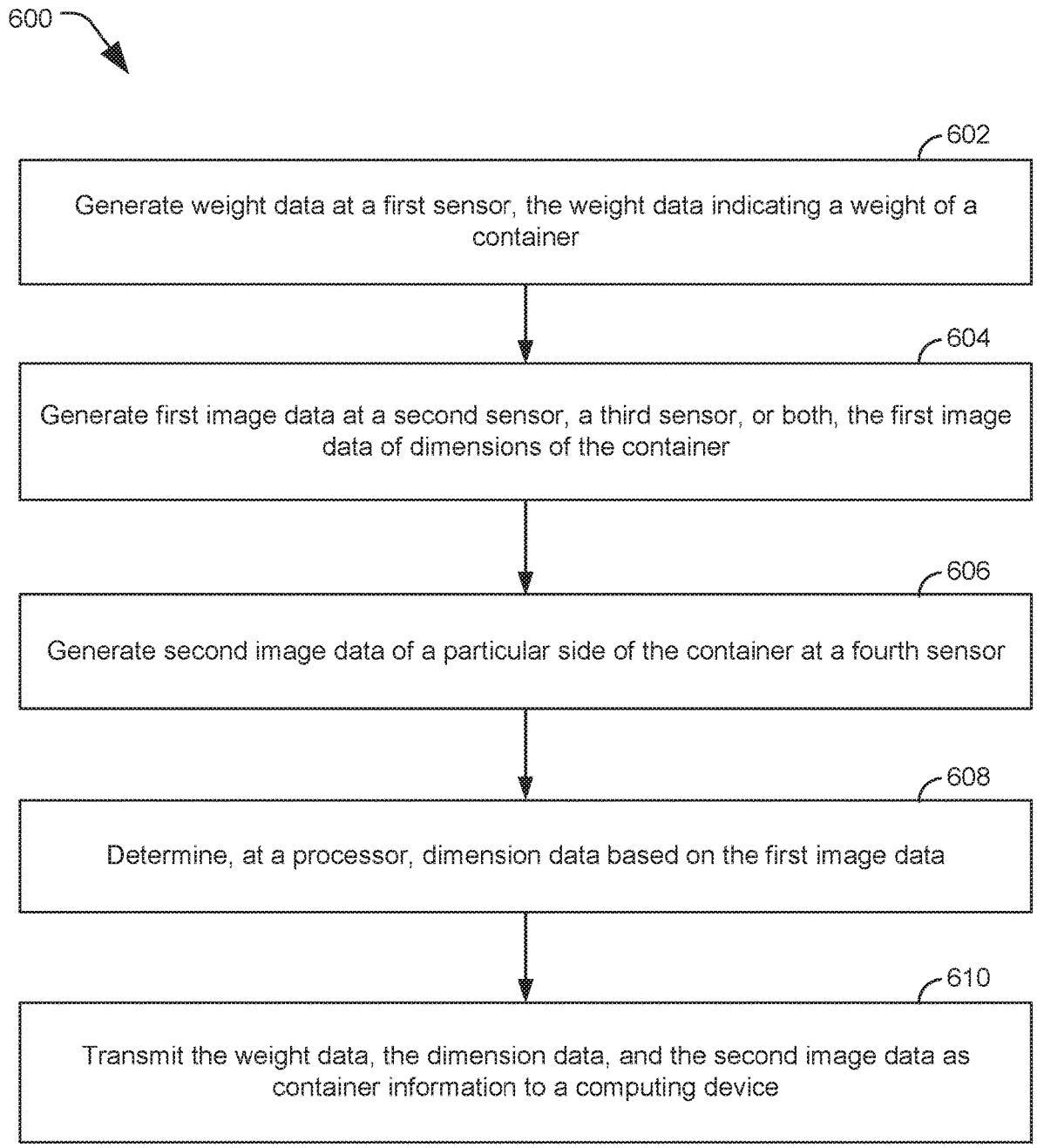
FIG. 6 is a flow diagram of an exemplary method of measuring characteristics of a container in accordance with the present disclosure.

Referring to FIG. 6, a flow diagram of a method 600 of measuring characteristics of a container in accordance with the present disclosure is shown. In some implementations, method 600 may be performed by edge device 102 of FIG. 1 or device 200 of FIG. 2. For example, steps of method 500 may be stored as instructions (e.g., the instructions described above with reference to FIG. 1) that may be executed by one or more processors (e.g., the one or more processors described above with reference to edge device 102 of FIG. 1 or device 200 of FIG. 2).

Method 600 includes generating weight data at a first sensor, at 602. The weight data indicates a weight of a container. For example, device 200 may generate weight data at first sensor 204. Method 600 also includes generating first image data at a second sensor, a third sensor, or both, at 604. The first image data is of dimensions of a container. For example, device 200 may generate first image data at second sensor 206, third sensor 208, or both. Method 600 includes generating second image data of a particular side of the container at a fourth sensor, at 606. For example, device 200 may generate second image data at fourth sensor 210.

Method 600 also includes determining, at a processor, dimension data based on the first image data, at 608. For example, processor 212 may determine dimension data based on the first image data from second sensor 206, third sensor 208, or both. Method 600 further includes transmitting the weight data, the dimension data, and the second image data as container information to a computing device, at 610. For example, edge device 102 may bundle weight data 112, dimension data 114, and image data 116 as container information 150 and transmit container information 150 to computing device 120.

In some implementations, the first sensor includes a scale, and the fourth sensor includes a high-definition camera. For example, first sensor 204 may include a digital scale, and fourth sensor 210 may include a high-definition camera. Additionally, or alternatively, the second sensor includes a camera and the third sensor includes an ultrasound sensor. For example, second sensor 206 includes a camera, such as a USB camera, and third sensor 208 includes an ultrasound sensor.

In some implementations, a reference marker may be coupled to an opposite side from the second sensor. The reference marker is configured to enable determination of a thickness of the container based on a comparison of the thickness to the reference marker. In some such implementations, the reference marker includes a triangle that is located a particular distance above a base, and the thickness is determined based on a number of pixels between a top of the container and the triangle. For example, reference marker 304 may be located a particular distance (corresponding to a particular number of pixels) above receptacle 202, and thickness of a container may be determined based on the number of pixels that are visible between the top of the container and reference marker 304.

Thus, method 600 enables determination of compliance of a container with stored composite signatures using a simple, automated device to measure characteristics of the container. The device is modular and relatively small, thus easy to fit at a work station of a postal service employee or other worker. Additionally, the size and modularity of the device make it easily portable, as compared to large mail sorting systems.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 9) may comprise processors, electronics devices, hardware devices, electronics components, logical circuits, memories, software codes, firmware codes, etc., or any combination thereof. In addition, features discussed herein relating to FIG. 9 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIGS. 5-6) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system for measuring characteristics of a mailing container, the system comprising:
   an edge device configured to measure characteristics of a mailing container received by the edge device, the edge device comprising:
   a first sensor configured to generate weight data indicating a weight of the mailing container;
   a second sensor, a third sensor, or both configured to generate first image data of dimensions of the mailing container;
   a fourth sensor configured to generate second image data of a particular side of the mailing container;
   a processor coupled to the first sensor, the second sensor, the third sensor, and the fourth sensor and configured to determine dimension data based on the first image data; and
   a network interface configured to transmit the weight data, the dimension data, and the second image data as mailing container information to a computing device;
   the computing device comprising:
   a second processor configured to determine whether the mailing container complies with one or more stored composite signatures based on a composite signature generated based on the mailing container information; and
   a reference marker, wherein the reference marker comprises a triangle that is coupled to the edge device and located a particular distance above a base of the edge device, and wherein the reference marker is configured to enable a determination of a thickness of the mailing container based on a number of pixels between a top of the mailing container and the triangle in the first image data.

2. The system of claim 1, wherein the first sensor comprises a scale, and wherein the fourth sensor comprises a high-definition camera.

3. The system of claim 1, wherein the second sensor comprises a camera, and wherein the third sensor comprises an ultrasound sensor.

4. The system of claim 1, wherein the reference marker is further configured to enable determination of the thickness of the mailing container based on a comparison of the thickness to the reference marker.

5. The system of claim 1, wherein the computing device further comprises:
   a second network interface configured to receive, from the edge device, the mailing container information;
   the second processor coupled to the second network interface; and
   a second memory coupled to the second processor, the second memory storing instructions that, when executed by the second processor, cause the second processor to:
   generate the composite signature corresponding to the mailing container based on the mailing container information,
   the composite signature comprising one or more of dimensions of the mailing container, a weight of the mailing container, and indicia of the mailing container;
   access a database to identify the one or more stored composite signatures corresponding to the composite signature,
   the one or more stored composite signatures corresponding to one or more other mailing containers;
   compare the composite signature to the one or more stored composite signatures to determine whether the composite signature is in compliance with the one or more stored composite signatures; and
   control a process to manage a release of the mailing container into a mail stream based on whether the composite signature is in compliance with the one or more stored composite signatures.

6. The system of claim 5, wherein the computing device further comprises a display device configured to display a user interface that indicates whether the composite signature is in compliance with the one or more stored composite signature.

7. The system of claim 1, wherein:
   the second image data includes one or more images of one or more indicia located on the particular side of the mailing container; and
   comparing the composite signature to the one or more stored composite signatures comprises comparing sizes of the one or more indicia, locations of the one or more indicia, shapes of the one or more indicia, text of the one or more indicia, or a combination thereof, to corresponding features of indicia corresponding to the one or more stored composite signatures.

8. The system of claim 1, wherein:
   the second image data includes one or more images of one or more indicia located on the particular side of the mailing container; and
   the composite signature is in compliance with the one or more stored composite signatures when the dimensions of the mailing container substantially match dimensions of one of one or more other mailing containers that correspond to the one or more stored composite signatures, when the weight of the mailing container substantially matches a weight of one of the one or more other mailing containers, when the indicia of the mailing container substantially match indicia of one of the one or more other mailing containers, or a combination thereof.

9. The system of claim 1, wherein the edge device further comprises a receptacle configured to receive the mailing container for generation of the weight data, the first image data, or the second image data.

10. The system of claim 9, wherein:
the edge device further comprises a frame; and
the receptacle, the first sensor, the second sensor, the third sensor, and the fourth sensor are coupled to or supported by the frame.

11. The system of claim 10, wherein:
the edge device is modular; and
the receptacle is detachably coupled to the frame.

12. A method for measuring characteristics of a mailing container, the method comprising:
generating, by a first sensor of an edge device, weight data indicating a weight of a mailing container received by the edge device;
generating, by a second sensor of the edge device, a third sensor of the edge device, or both, first image data of dimensions of the mailing container;
generating, by a fourth sensor of the edge device, second image data of a particular side of the mailing container;
determining, by a processor of the edge device, dimension data based on the first image data; and
transmitting the weight data, the dimension data, and the second image data as mailing container information to a computing device,
the computing device configured to determine whether the mailing container complies with one or more stored composite signatures based on a composite signature generated based on the mailing container information, and
the computing device further configured to determine a thickness of the mailing container based on a reference marker, wherein the reference marker comprises a triangle that is coupled to the edge device and located a particular distance above a base of the edge device, and wherein the reference marker is configured to enable determination of the thickness of the mailing container based on a number of pixels between a top of the mailing container and the triangle in the first image data.

13. The method of claim 12, further comprising:
receiving, at a second processor of the computing device from an edge device, the mailing container information;
generating, at the second processor, the composite signature corresponding to the mailing container based on the mailing container information,
the composite signature comprising one or more of dimensions of the mailing container, a weight of the mailing container, and indicia of the mailing container;
accessing, at the second processor, a database to identify the one or more stored composite signatures corresponding to the composite signature,
the one or more stored composite signatures corresponding to one or more other mailing containers;
comparing, at the second processor, the composite signature to one or more stored composite signatures to determine whether the composite signature is in compliance with the one or more stored composite signatures; and
controlling, by the second processor, a process to manage a release of the mailing container into a mail stream based on whether the composite signature is in compliance with the one or more stored composite signatures.

14. The method of claim 13, further comprising:
performing, by the second processor, optical character recognition (OCR) on one or more indicia included in an image of the second image data to determine text on the particular side of the mailing container; and
comparing, by the second processor, the text on the particular side of the mailing container to text included in the one or more stored composite signatures.

15. The method of claim 13, further comprising training, by the second processor, a machine learning model based on training data, wherein training the machine learning model comprises:
receiving the training data;
sorting the training data;
looping over images in the training data;
resizing each image of the training data to a fixed size;
calculating features for each image of the training data;
scaling the features for each image of the training data;
training the machine learning model based on the features; and
storing the machine learning model in a memory.

16. The method of claim 15, wherein comparing the composite signature to the one or more stored composite signatures comprises applying the machine learning model to the composite signature and the one or more stored composite signatures, and wherein the machine learning model comprises a random forest model.

17. The method of claim 13, wherein controlling the process to manage the release of the mailing container comprises:
adjusting the indicia based on the one or more stored composite signatures; or
stopping the release of the mailing container into the mail stream.

18. The method of claim 13, further comprising generating, by the second processor, a graphical user interface (GUI) that includes an indication of whether the composite signature is in compliance with the one or more stored composite signatures and the dimensions of the mailing container, the weight of the mailing container, an image of one or more indicia on a particular side of the mailing container, an indication of one or more errors when the composite signature is not in compliance with the one or more stored composite signatures, or a combination thereof.

19. The method of claim 18, wherein the GUI further includes a display of a similarity index comprising a numerical value that indicates a similarity between the mailing container in an image and a particular mailing container corresponding to one of the one or more stored composite signatures in another image.

* * * * *